Aug. 27, 1968      W. D. WHITNEY      3,398,565
HYDRAULIC PULLING DEVICE
Filed Nov 10, 1966
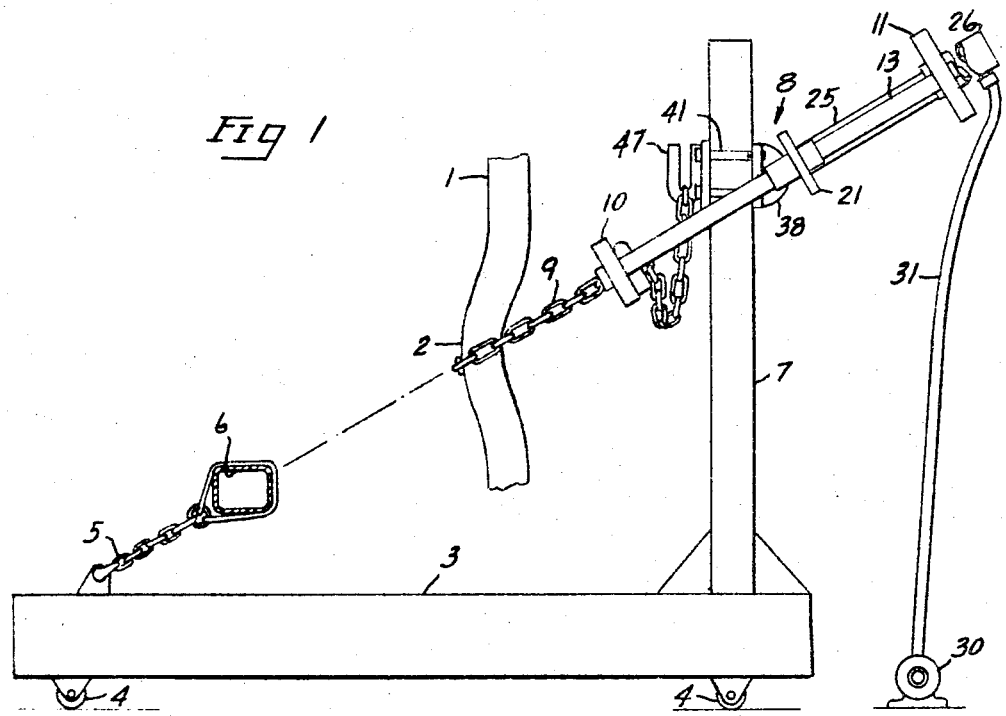
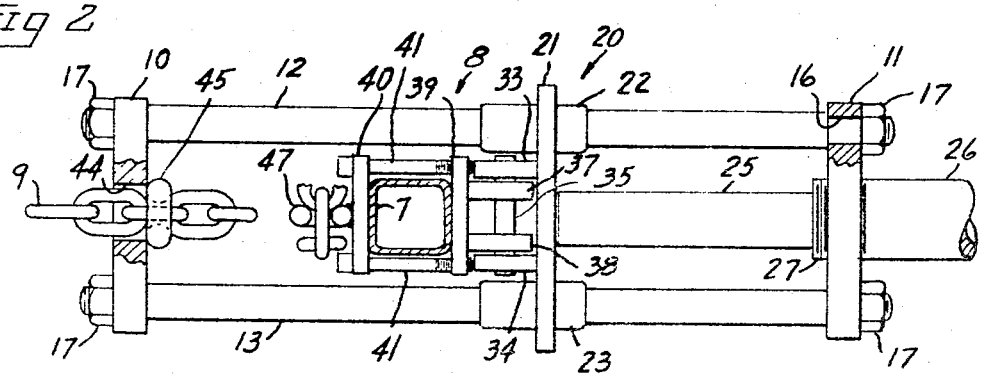
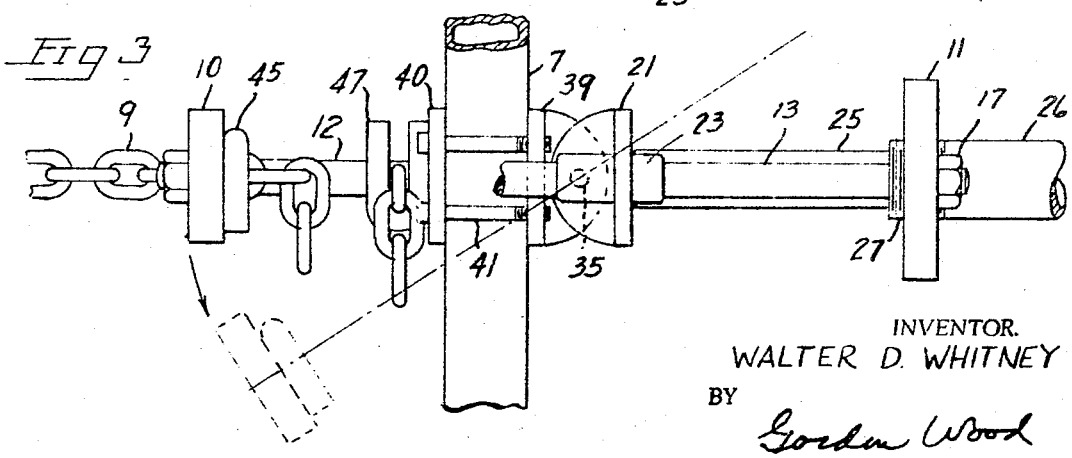
INVENTOR.
WALTER D. WHITNEY
BY
Gordon Wood з,398,565
Patented Aug. 27, 1968

3,398,565
HYDRAULIC PULLING DEVICE
Walter D. Whitney, 1044 San Remo Way,
San Carlos, Calif. 94070
Filed Nov. 10, 1966, Ser. No. 593,543
5 Claims. (Cl. 72—453)

ABSTRACT OF THE DISCLOSURE

Pulling apparatus for applying heavy pulling loads to portions of a vehicle body in connection with repair operations on the same. The apparatus is actuated by a hydraulic cylinder and is swingably mounted to permit application of forces at various angles. The hydraulic cylinder is positioned substantially outside of the frame of the apparatus to afford optimum movement of the pulling element.

---

This invention relates to pulling apparatus of the type that includes a hydraulic cylinder employed to exert a relatively large pulling effort. The present invention is particularly adapted for use in automobile repair shops when it is desired to pull back into shape a portion of the frame or body that has been deformed.

Various devices have been proposed in the past for exerting a relatively large pulling force on members such as portions of an automobile body. Such prior art devices have had several disadvantages which make their use difficult and ineffective in many instances. For example, since it is very seldom that the pulling effort required to straighten a part of an automobile body is either vertical or horizontal, in most instances the desired pull required to effect the repair must be at an angle to the horizontal. Thus, prior art devices which do not provide for exerting the pull at various angles are not capable of doing an effective job.

Another disadvantage of prior art devices of this type is that they have been relatively expensive and thus have not been adopted to the extent otherwise warranted. Some devices, for example, are designed so as to require two hydraulic cylinders in order to direct the pull along the central axis of the supporting frame. The present invention lends itself to use of only one cylinder thus reducing the cost of the apparatus.

The main object of the present invention is therefore the provision of a hydraulic pulling apparatus which overcomes many of the disadvantages of prior art devices of like nature.

Another object of the invention is the provision of a relatively inexpensive hydraulic pulling apparatus which is extremely versatile and flexible in use and which is capable of exerting a pulling force at any angle.

Still another object of the invention is the provision of a hydraulically operated pulling apparatus that is extremely simple to use and which may be set up in its operating position with a minimum of effort.

Other objects and advantages will be apparent from the following specification and from the drawings.

FIG. 1 is a semischematic side elevation of the apparatus of the present invention showing the same in cooperation with two portions of an automobile structure.

FIG. 2 is a top plan view of the hydraulic pulling device arranged for pulling in a horizontal direction.

FIG. 3 is a side elevation of the apparatus of FIG. 2.

In detail, and first with reference to FIG. 1, the present invention has numerous applications and only one is shown as an example. In the illustrated case the invention is employed to bend back to its proper position a damaged vertically extending post portion of an automobile body. The post is designated 1 in FIG. 1 and the apparatus is being employed to remove a bend 2 from said post.

The hydraulic pulling device is preferably employed with a wheeled base generally designated 3 adapted to be moved from place to place on wheels 4.

The base 3 is preferably provided with a connecting means such as chain 5 which may be employed to secure the base 3 to a relatively heavy structure such as a frame element 6 of an automobile. At one end of base 3 there is provided an upstanding post 7 on which the hydraulic pulling apparatus generally designated 8 may be secured. The apparatus 8 is provided with a chain 9 which may be secured in any desired manner to the bent portion 2 or to whatever other article is to be pulled.

The pulling unit comprises a rigid frame which includes a pair of relatively heavy end plates 10, 11 respectively. The plate 10 may be considered the forward end and is connected to the rear plate 11 by means of a pair of elongated rods 12, 13 which are reduced in diameter adjacent their ends and pass through holes 16 in plates 10, 11 and are threaded at their extremities to receive nuts 17. In this manner a readily assembled and extremely rigid frame is provided.

Slidably supported on the rods 12, 13 is a clamping device generally designated 20 which includes a rectangular base plate 21 through which are secured sleeves 22, 23 reciprocable on rods 12, 13 respectively.

The base plate 21 is adapted to be engaged by the outer end of the plunger 25 of a hydraulic cylinder 26. Hydraulic cylinder 26 is conventional and no claim is made thereto except in combination with the present invention. The end plate 11 may be provided with a central threaded aperture for threadedly receiving therein the threaded end 27 of cylinder 26. As seen in FIG. 1 cylinder 26 is actuated by a conventional hydraulic pump 30 which is connected to the end opposite threaded end 27 of cylinder 26 by a flexible hose 31. At this point it will be noted that upon actuation of pump 30 to force hydraulic fluid into cylinder 26, plunger 25 will engage base plate 21 of the clamping means 20 urging the latter away from the rear end 11 of the frame. In actual use the clamping means 20 is fixedly secured to upstanding post 7 so that actually the rear end 11 of the frame moves away from the post thus carrying the remainder of the frame with it.

For the purpose of securing base plate 21 of clamping means 20 to the post 7 a pair of transversely spaced lugs 33, 34 are welded to base plate 21 and are provided with apertures for receiving a pivot pin 35 therethrough. Swingable on pivot pin 35 are another pair of lugs 37, 38 which are fixed as by welding to a clamping jaw 39. This clamping jaw 39 cooperates with a similar clamping jaw 40 and said jaws are adjustable relative to each other by four bolts 41. At this point it will be seen that with the clamping jaws 39, 40 spaced apart a sufficient distance to permit the post 7 to be received therebetween the apparatus may be moved downwardly along post 7 from the upper end of the latter and then secured to said post at the desired position by tightening bolts 41 to clamp the post 7 between said clamping jaws 39, 40.

The forward end plate 10 of the frame is provided with a central aperture 44 which is adapted to receive therethrough the chain 9 (FIG. 1). The chain 9 may be passed through aperture 44 to whatever extent is desired to initially tighten the same about the member to be pulled. When the chain is in its proper position it may be held relative to forward end plate 10 by means of a hook or a U-shaped clevis or the like indicated at 45. The legs of the clevis 45 are spaced apart a sufficient amount to permit one link of the chain to be received therebetween but to abut the adjacent link as seen in FIGS. 2 and 3. The slack end of chain 9 may be conveniently retained by a U-bolt 47 welded to clamping jaw 40.

In operation, after the clamping device 20 has been secured to post 7 at the desired point along the length of the latter the chain 9 may then be secured to the member which it is desired to pull and the chain 9 may then be passed through aperture 44 until it is taut. At that point the clevis 45 is applied to forward end plate 10 and the pump 30 actuated. As best seen in FIGS. 1, 3 the apparatus automatically tilts itself to the desired angle and it will be noted that the line of action of pull is in alignment with the connecting chain 5 from base 3.

If the distance through which the pull is to be effected is greater than the stroke of cylinder 26 it is a simple matter to reverse pump 30, pull the chain 9 through aperture 44 an additional amount until the base 21 of the clamping device 20 is adjacent the end of cylinder 26 and then tighten the chain 9 again by means of clevis 45 and repeat the operation.

It will be apparent that the above described invention provides a relatively inexpensive hydraulically actuated pulling means which is extremely flexible in use and adaptable to various conditions.

The above very specific description of the preferred form of the invention is not to be taken as restrictive as it will be apparent that various modifications in design may be resorted to without departing from the scope of the following claims.

I claim:
1. Pulling apparatus comprising:
   an elongated rigid frame including a pair of opposite ends,
   clamp means adapted to be clamped to a stationary structure and including a base slidably mounted on said frame for movement longitudinally thereof,
   a hydraulic cylinder having one end fixedly secured to one of said frame ends and extending outwardly therefrom and away from the other end of said frame, said cylinder having a plunger extending inwardly of said one end of said frame into engagement with said base for relatively moving said clamp means and said one end away from each other upon projection of said plunger from said cylinder,
   means at the other end of said frame for fixedly securing a tension element thereto for exerting a pull on said tension element when said plunger is projected.

2. Apparatus according to claim 1 wherein said clamp means includes a pair of opposed clamping jaws and one of said jaws is pivotally connected to said base whereby said frame may swing relative to said stationary structure and into alignment with the line of action of said tension element.

3. Apparatus according to claim 1 wherein said opposite ends are connected by a pair of parallel elongated rods and said base is slidably supported on said rods.

4. Apparatus according to claim 1 wherein the pivotal connection of said base is on the longitudinal central axis of said cylinder.

5. Apparatus according to claim 2 wherein said jaws are secured to an upstanding post fixedly secured at its lower end to a wheeled base, and means is provided on said base for connecting the same to a fixed member whereby the tension in said tension element may be resisted by said connecting means with said tension element and said connecting means in alignment.

References Cited

UNITED STATES PATENTS

| | | | |
|---|---|---|---|
| 2,100,564 | 11/1937 | Mandl et al. | 72—705 |
| 2,692,002 | 10/1954 | Merrill et al. | 72—705 |
| 2,836,219 | 5/1958 | Pertner | 72—705 |
| 3,029,859 | 4/1962 | Grant | 72—705 |
| 3,050,099 | 8/1962 | Smith | 72—705 |

CHARLES W. LANHAM, *Primary Examiner.*

B. J. MUSTAIKIS, *Assistant Examiner.*